United States Patent
Dao Trong et al.

(10) Patent No.: US 9,430,190 B2
(45) Date of Patent: Aug. 30, 2016

(54) FUSED MULTIPLY ADD PIPELINE (71) Applicant: INTERNATIONAL BUSINESS MACHINES CORPORATION, Armonk, NY (US)

(72) Inventors: Son Dao Trong, Boeblingen (DE); Michael Klein, Boeblingen (DE); Christophe Layer, Grenoble (FR); Silvia M. Mueller, Schoenaicher (DE)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 14/169,864

(22) Filed: Jan. 31, 2014

(65) Prior Publication Data

US 2014/0244704 A1   Aug. 28, 2014

(30) Foreign Application Priority Data

Feb. 27, 2013 (GB) .................................. 1303464.0

(51) Int. Cl.
*G06F 7/38* (2006.01)
*G06F 7/483* (2006.01)
*G06F 7/53* (2006.01)
*G06F 7/533* (2006.01)
*G06F 7/544* (2006.01)

(52) U.S. Cl.
CPC ............. *G06F 7/483* (2013.01); *G06F 7/5312* (2013.01); *G06F 7/5338* (2013.01); *G06F 7/5443* (2013.01)

(58) Field of Classification Search
CPC ..................................................... G06F 7/483
USPC ................................................. 708/523, 501
See application file for complete search history.

(56) References Cited

U.S. PATENT DOCUMENTS

| 6,480,872 | B1 | 11/2002 | Choquette |
| 7,720,900 | B2 | 5/2010 | Gerwig et al. |
| 7,730,117 | B2 | 6/2010 | Fleischer et al. |
| 8,024,393 | B2 | 9/2011 | Ho et al. |
| 8,106,914 | B2 | 1/2012 | Oberman et al. |
| 8,838,664 | B2 * | 9/2014 | Oliver ..................... G06F 7/483 708/523 |
| 2005/0228844 | A1 | 10/2005 | Dhong et al. |
| 2006/0101244 | A1 | 5/2006 | Siu et al. |
| 2011/0231460 | A1 | 9/2011 | Ahmed |
| 2012/0124117 | A1 | 5/2012 | Yu et al. |

OTHER PUBLICATIONS

Huang, Libo, et al. "A new architecture for multiple-precision floating-point multiply-add fused unit design." Computer Arithmetic, 2007. ARITH'07. 18th IEEE Symposium on. IEEE, Jun. 25-27, 2007.

Bruguera, Javier D et al. "Floating-point fused multiply-add: reduced latency for floating-point addition." Computer Arithmetic, 2005. ARITH-17 2005. 17th IEEE Symposium on. IEEE, Jun. 27-29, 2005.

* cited by examiner

*Primary Examiner* — Tan V. Mai
(74) *Attorney, Agent, or Firm* — Brian F. Russell; Parashos Kalaitzis (57) ABSTRACT

A method for operating a fused-multiply-add pipeline in a floating-point unit of a processor is disclosed. A multiplication is initially performed between a first operand and a second operand in a multiplier block to obtain a set of partial product results. The partial product results are sent to a carry-save adder block. A partial product reduction is performed on the partial product results to generate a carry-save result having a sum term and a carry term. The carry-save result is then formatted to generate a carry-out bit. The carry-save result is added to a third operand to generate a final result.

20 Claims, 6 Drawing Sheets

FUSED MULTIPLY ADD PIPELINE

PRIORITY CLAIM

The present application claims benefit of priority under 35 U.S.C. §§120, 365 to the previously filed German Patent Application No. 1303464.0 filed on Feb. 7, 2013, which is incorporated by reference herein.

BACKGROUND OF THE INVENTION

1. Technical Field

The present invention relates to data processing systems in general, and, in particular, to a fast fused-multiply-add pipeline within a data processing system.

2. Description of Related Art

The "IEEE-754 Standard for Binary Floating point Arithmetic" specifies a floating-point data architecture that is commonly implemented in computer hardware, such as floating-point processors having multipliers. The format consists of a sign, an unsigned biased exponent, and a significand. The sign bit is a single bit and is represented by an "S." The unsigned biased exponent, represented by an "e," is 8 bits long for single precision and 11 bits long for double-precision. The significand is 24 bits long for single precision and 53 bits long for double-precision. As defined by the IEEE-754 standard, the most significant bit of the significand, the implicit bit is decoded out of the exponent bits.

To improve floating-point arithmetic processing, most modern processors use a process called the fused-multiply-add (FMA) process to combine a floating-point multiplication operation and a floating-point addition operation for execution as a single instruction, e.g., (A×C)+B, where A, B and C are operands. By performing two operations in a single instruction, the FMA reduces overall execution time and hardware costs. The FMA also provides improved precision because rounding need only be performed after both the multiplication and addition operations are performed at full precision (i.e., there is only one rounding error instead of two).

In floating-point processors, one central area is the multiplier array. The multiplier array is used to do multiplication of two numbers. Usually Booth's encoding, which is a commonly used fast multiplication algorithm, with radix 4 is used. This reduces the number of product terms that need to be summed up to n/2+1, where n being the number of bits per operand. The summation is done using a carry-save-adder circuitry which allows processing of all bits in parallel (as opposed to the normal addition where the carry-out of the lower bit position is chained to the next higher position, which is performed usually by a carry-propagate-adder circuitry). The circuitry that does this summation is called reduction tree. At the end of the reduction tree there remain two terms, the sum term and the carry term, which represent a summation part of information and a carry part of information, respectively. These finally are added with the aligned addend. Again, here a carry-save-addition is done. Finally, only two terms, also a sum and a carry term, remain, these two must be added using the carry-propagate-adder to generate one final result.

United States patent application US 2011/0231460 describes a method for processing an FMA operation involving an addend, a first multiplicand, and a second multiplicand. The method focuses on calculating an alignment shift count for the addend input and aligning the addend input based on the alignment shift count, before adding it to the product of the first multiplicand input and the second multiplicand. At the end the sum of this addition process is normalized, rounded and complement-adjusted to deliver the final result of the FMA process.

The present disclosure provides an improved method and apparatus for operating a fast fused-multiply-add pipeline.

SUMMARY OF THE INVENTION

In accordance with a preferred embodiment of the present invention, a multiplication is performed between a first operand and a second operand in a multiplier block to obtain a set of partial product results. The partial product results are sent to a carry-save adder block. A partial product reduction is performed on the partial product results to generate a carry-save result having a sum term and a carry term. The carry-save result is then formatted to generate a carry-out bit. The carry-save result is added to a third operand to generate a final result.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Due to the nature of the Booth encoding algorithm, there is always one and only one carry-out bit from adding the partial product terms. For double-precision format, the input operands are not left-aligned, so they have 3 leading zero bits each. Thus, the result of the multiplication has at least 6 leading zero bits, which are the ones that can be shifted out.

The following example of final two partial product terms (sum term s0d and carry term c0d) may demonstrate this:

$$c0d = yyyyyy xxxxxxxxxxxxxxxxxx$$
$$s0d = yyyyyy xxxxxxxxxxxxxxxxxx$$
$$\overline{\text{Sum} = c000000 xxxxxxxxxxxxxxxxxx}$$

The sum always have a carry bit c, and must have six leading zeros followed by bits of any value depending on the result. Instead of adding the upper 6 bits of c0d and s0d to calculate the carry-out bit, it may be performed an XNOR operation of the last one of the first six bits in order to determine the carry-out bit according to the invention.

A short case study may demonstrate three situations for the generation of the carry-out bit.

a. Carry Kill Situation:
   c0d=-----0xxxxxxxxxxxxxxxxxx
   s0d=-----0xxxxxxxxxxxxxxxxxx Adding the lower bits cannot generate a carry-out bit (otherwise the upper 6 bits would not be all zero), therefore a carry-out bit should have occurred during the previous reduction steps.

b. Carry Generate Situation:
   c0d=-----1xxxxxxxxxxxxxxxxxx
   s0d=-----1xxxxxxxxxxxxxxxxxx This situation produces the expected carry-out bit due to the multiplication.

c. Carry Propagate Situation:
   c0d=-----1xxxxxxxxxxxxxxxxxx
   s0d=-----0xxxxxxxxxxxxxxxxxx In this case, adding the lower bits must generate a carry-out to nullify the last of the first 6 bits of the sum (and thus propagate to carry-out). A carry-out in one of the earlier reduction steps did not occur.

The present invention may be used for any formatting where the input operands have any number of leading zeros and the result partial terms need to be left-aligned to remove the leading zeros. Instead of adding the bits that are shifted out just for determining the carry-out, only an XNOR of the lowest significant bits of the shifted bits need to be done. Easy detection of the generation of a carry-out bit may be achieved by one XNOR gate without addition of the upmost 6 bits of the carry-save result.

Favorably, a carry-out bit may be generated from adding the third operand to the carry-save result can be suppressed. Due to the nature of Booth encoding, there must be always one and only one carry-out from adding the partial product terms. For double-precision format, the input operands are not left-aligned so they have 3 leading zero bits each. Thus, the result of the multiplication has at least 6 leading zero bits, these are the ones that can be shifted out. The sum term of the carry-save result can have a carry bit but must have six leading zeros and bits of any value depending on the carry-save result.

Figure 1:
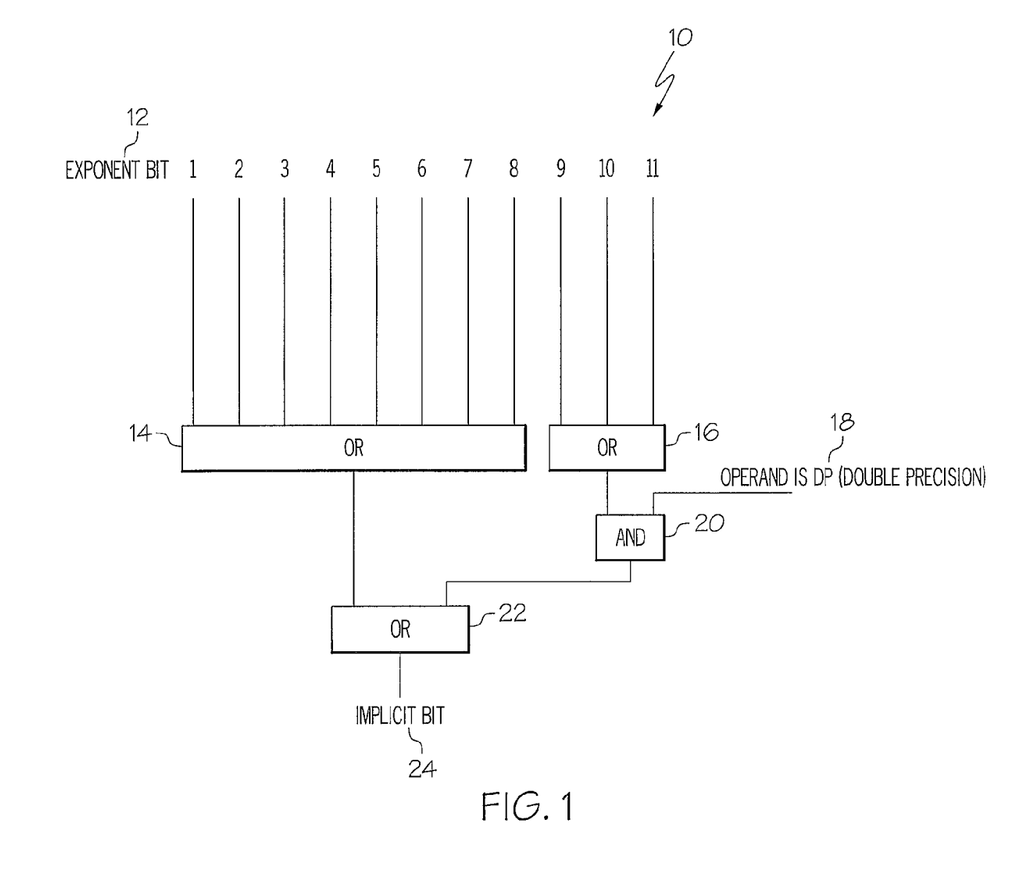
FIG. 1 illustrates a circuit for implementing a detection algorithm of an implicit bit according to IEEE-754 standard.

Referring now to the drawings, and in particular to FIG. 1, there is illustrated a circuit 10 for implementing a detection of an implicit bit according to the IEEE-754 standard. As defined by the IEEE-754 standard, the implicit bit is decoded out of the exponent bits. The circuitry for detection of the implicit bit is an OR-tree. For timing reasons of the fast multiply-add method to generate the implicit bit, it is not generated before getting into an operand latch, therefore the bit position of the implicit bit is left vacant (set equal to zero) for the fast multiply-add method described herein. The implicit bit is corrected later in the multiplier array, detected according to state of the art. Exponent bits 12 (11 bits for a double-precision floating-point number), are fed to OR gates 14 and 16, wherein bits 9 to 11 are checked by an AND gate 20 which has an input 16 set to "true" if the operand is of double-precision format. Both outputs are fed to a final OR gate 22 which delivers the implicit bit 24 as an output.

Figure 2:
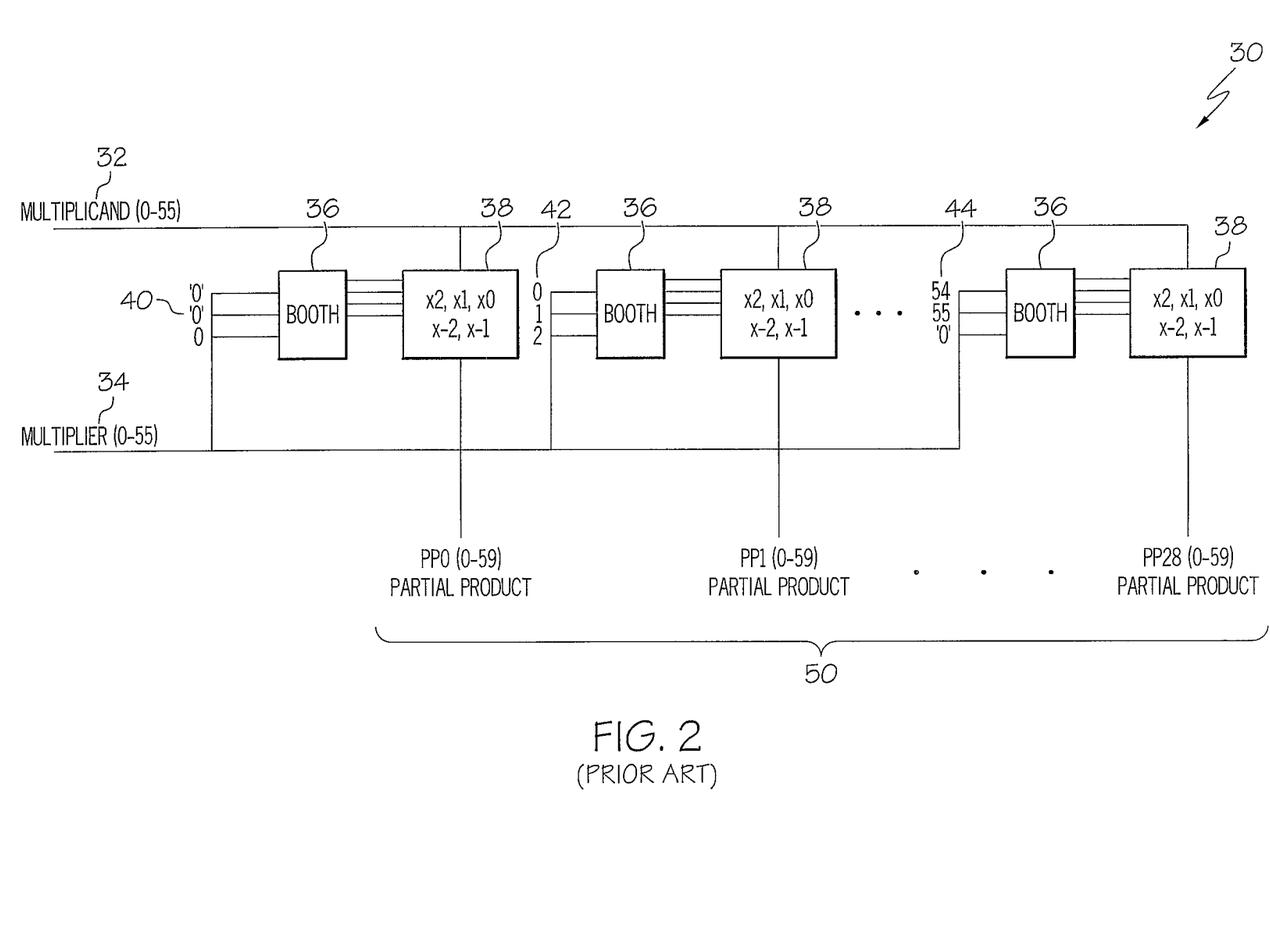
FIG. 2 shows a structure of a Booth encoding algorithm according to the prior art.

With reference now to FIG. 2, there is depicted a structure 30 of a Booth encoding algorithm according to the prior art. A first operand, named multiplicand 32, with 56 bits is fed to a pipeline of multiplying stages 36, 38 in parallel, where a first multiplication with a second operand, named multiplier 34, also with 56 bits, is performed. The multiplication process is performed in 29 single subprocesses, each subprocess representing a multiplication with only three bits of the multiplier 34 as marked in the pre-stages 36 each, first input 40 of two leading zeros and bit 0, second input 42 of bits 0, 1, 2, until the last input 44 of bits 54, 55 and a trailing zero. As an output of the multiplying stages 38, 29 partial products 50 result, as may be seen in the FIG. 2 from PP0, PP1 to PP28. After generating all the 29 partial products in parallel, the next step is to add these together to form the final result similarly to pencil-and-paper addition, each partial product placed two bits left to the preceding one, as is part of the Booth encoding algorithm.

Figure 3:
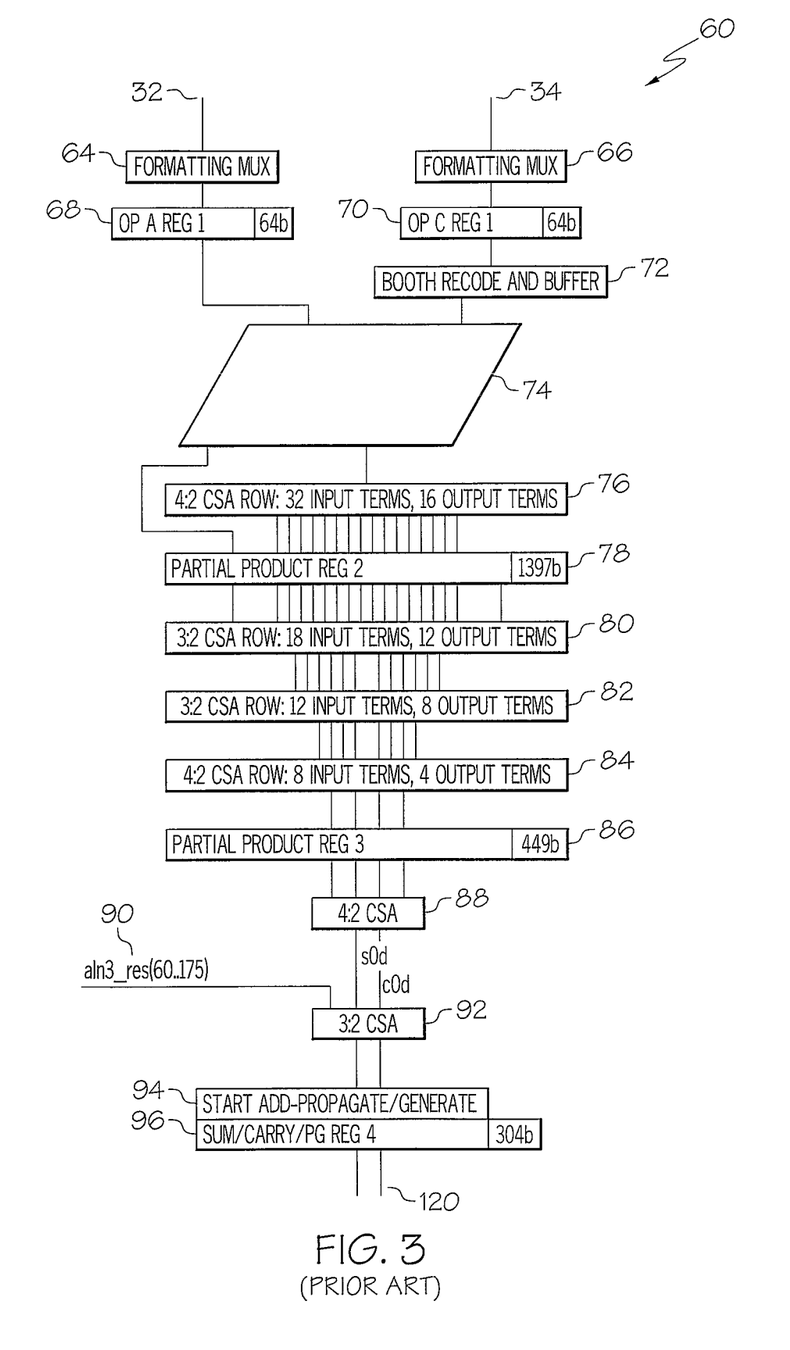
FIG. 3 illustrates a data processing structure for an FMA method according to the prior art.

Referring now to FIG. 3, there is depicted an environment for a shift of sum and carry terms resulting from a multiplier of a FMA method according to the prior art. As shown, a data processing structure 60 is utilized to perform the FMA method. Usually operands 32, 34 of different formats (such as hexadecimal and binary format) are left-aligned before being applied to the multiplier, which is performed in the formatting multiplexers 64, 66, before being fed to first operating registers 68. The multiplication result is therefore left aligned as well. This simplifies the data processing structure.

In a floating-point processor, one central area is the multiplier array. The multiplier array is used to do multiplication of two numbers 32, 34. Usually Booth's encoding, as described in FIG. 2, with radix 4 is used. This reduces the number of product terms that need to be summed up to $n/2+1$, where n is the number of mantissa bits per operand, which means that for a mantissa of 56 bits (as implemented here for hexadecimal as well as double-precision floating-point numbers) 29 product terms have to summed up. The summation is done using a carry-save-adder (CSA) circuitry which allows processing of all bits in parallel (as opposed to the normal addition where the carry-out of the lower bit position is chained to the next higher position, as is done in a carry-propagate-adder algorithm).

Instead of adding each partial product to the next one, the result is added to the third, etc. until all partial products are added. A parallel structure with CSAs is used to add all these partial products in parallel.

In FIG. 3, the partial products 74 from Booth encoding 72 are fed to a carry-save adder circuitry 76 and then to partial product register 78, reduced from 32 input terms to 16 output terms. The partial product data are then fed to further CSAs 80, 82, 84 until the remaining 4 output teens are fed to partial product register 86. Afterwards another CSA 88 reduces them to 2 output terms, a sum term s0d and a carry term c0d which are then fed to a last CSA 92, where also an addend 90 for the FMA algorithm is fed. This last addition 94 connected to register 96 generates the result 120 having a sum term and a carry term.

Figure 4:
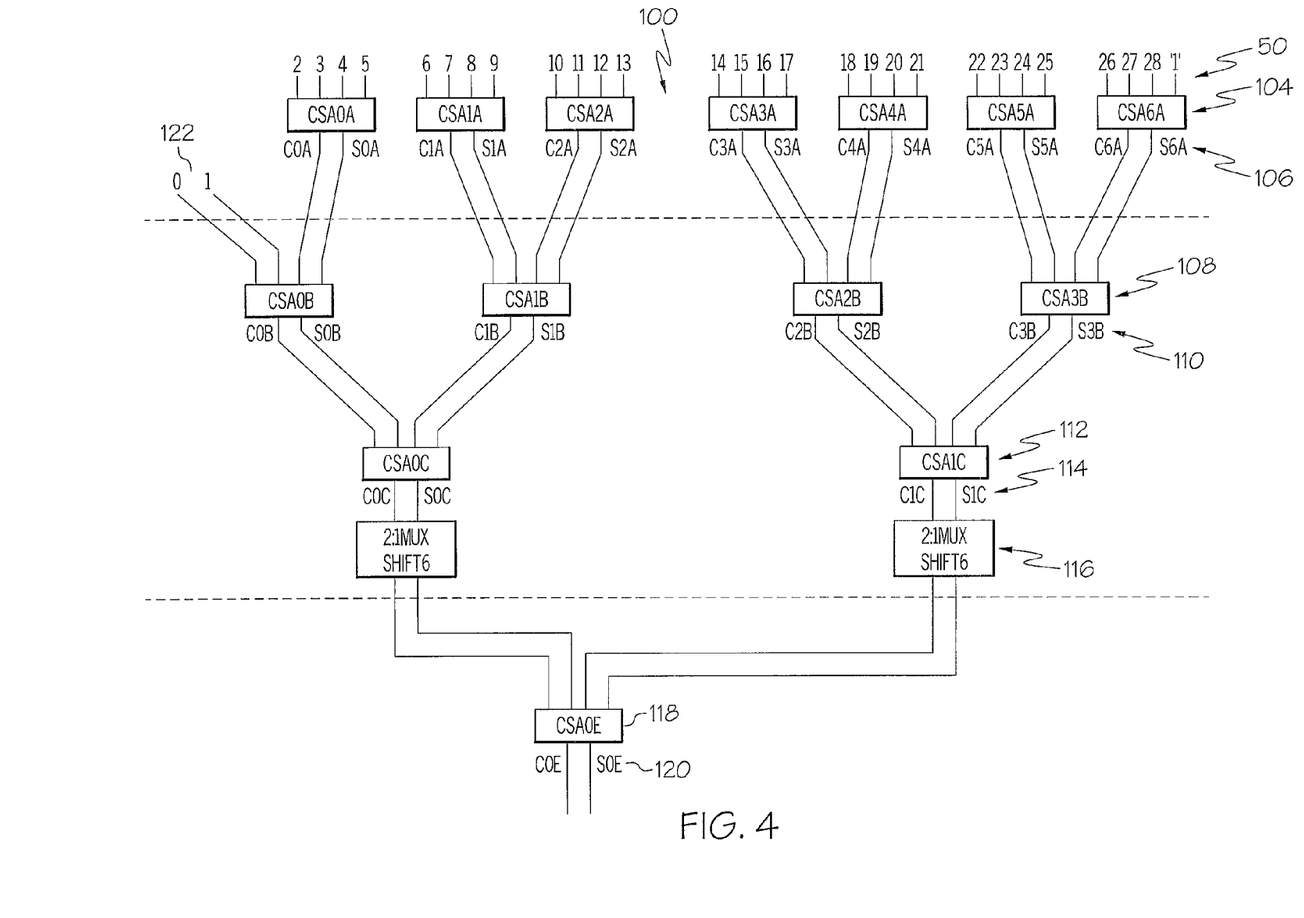
FIG. 4 shows a complete reduction tree, in accordance with a preferred embodiment of the present invention.

The circuitry that does this summation process is called a reduction tree, and it is shown in FIG. 4. At the end of the reduction tree there remain two terms, the sum and carry terms. These finally are added with the aligned addend. Again, here a carry-save-addition is done. Finally, only two terms remain, these two may be added using a carry-propagate-adder to generate one final result.

According to a preferred embodiment of the present invention, a 4-to-2 CSA for reducing the number of partial products from 4 to 2 may be used advantageously.

FIG. 4 shows a complete reduction tree 100, in accordance with a preferred embodiment of the present invention, that adds all the 29 partial product terms 50 and delivers the final two sum and carry result terms 120 that finally can be added to the final result of the multiplication. In FIG. 4, a first level of CSAs 104 is fed with the 27 partial products 50. Each CSA represents a 4-to-2 CSA, such that 7 partial products 106, with a sum term and a carry term each, are output to the next level of CSAs 108. Here also the remaining two partial products of the first level are also fed to. Another 4 outputs 110 are fed to the third level of CSAs 112, the output of which 114 is fed to a formatting level 116, where it is left-aligned and fed to the last CSA 118 in order to deliver the final result 120.

Figure 5:
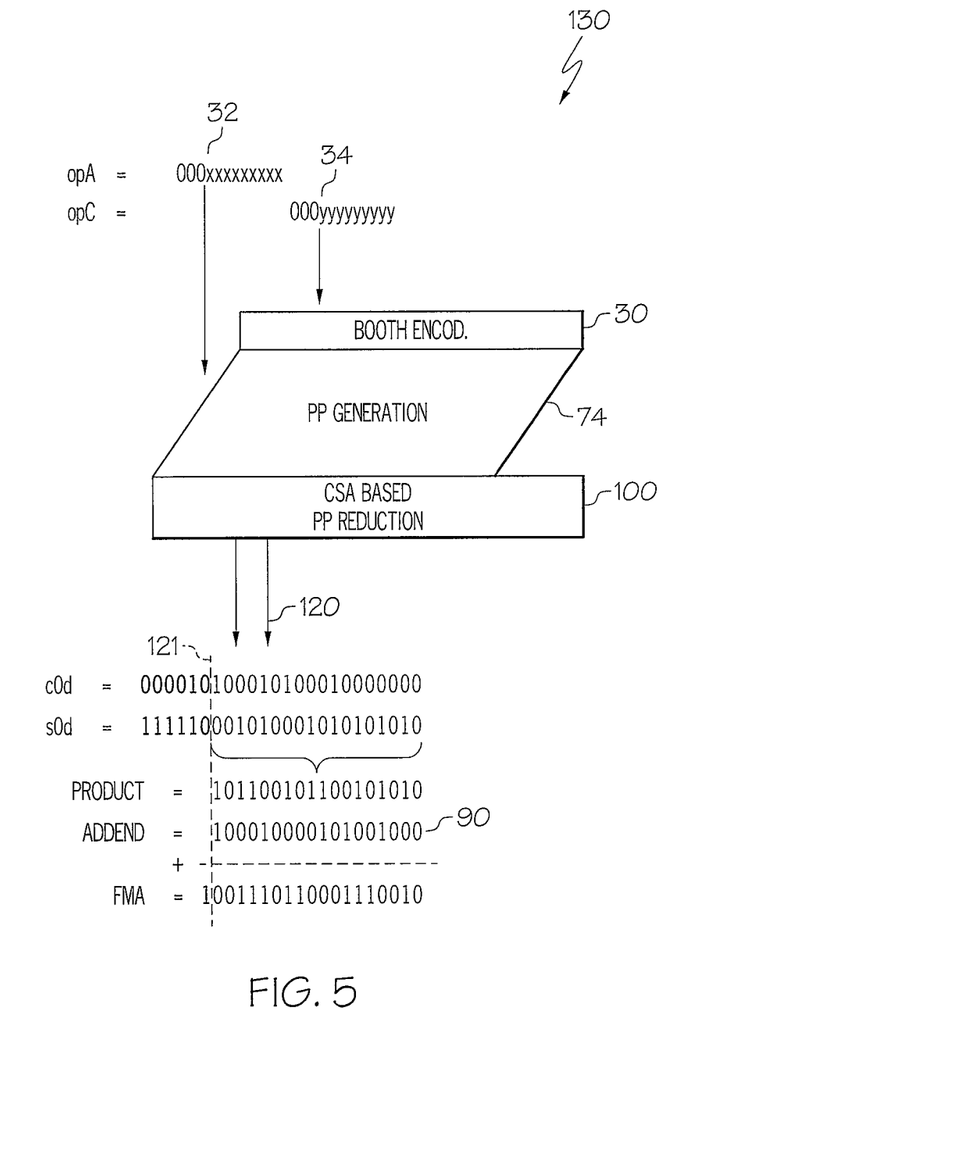
FIG. 5 shows an example for an FMA process, in accordance with a preferred embodiment of the present invention.

Referring now to FIG. 5, there is illustrated an example 130 of a fast FMA process, in accordance with a preferred embodiment of the present invention. Input for the FMA process are two operands 32 and 34. These operands are multiplied in a Booth encoding algorithm 30, partial products 74 are generated and then the partial products 74 are reduced in a CSA based partial product reduction tree 100 as described in FIG. 4. The result 120 is then added with an addend 90 in order to deliver the final result of the FMA process.

Due to the nature of the Booth encoding, there must be always one and only one carry-out from adding the partial product terms. Double-precision input operands are not left-aligned so they have at least 3 leading zero bits each. Then the multiplication result has at least 6 leading zero bits (the ones that can be shifted out). The sum term always has a carry bit but must have six leading zeros. This carry bit can be generated from the previous levels of partial product reduction and must not necessarily come from adding the carry term c0d with the sum term s0d. In multiply-add data flow according to the present invention, the full addition is not done just after partial product reduction but after reduction of the addend 90 into the product.

For double-precision numbers, a left shift of c0d and s0d by 6 bit would be needed. As shown in the example, the addition of these 6 bits should be performed to determine if there is a carry-out or not. This addition is time and area consuming, so the processing flow may be optimized in another way.

According to the present invention, instead of adding the upper 6 bits of c0d and s0d to check for the carry-out, only a logical operation which is limited to only two of the least significant bits 121 of a bit string that is shifted out is performed, which for instance may be an XNOR operation of the rightmost 121 of the first 6 bits of c0d and s0d. So a carry-out bit generated from adding the third operand 90 to the carry-save result 120 is suppressed and instead the carry-out bit generated by a much faster method.

Thus, a method to operate a fast fused-multiply-add pipeline in a floating-point unit of a processor, using a set of operands 32, 34, 90 as an input, wherein a data formatting step is performed after a partial product reduction in the pipeline instead of conversion of the input operands 32, 34, 90 to a floating-point format, comprising the steps of (i) receiving as an input to the pipeline at least a first operand 32 and a second operand 34 for generating a multiplication product and a third operand 90 to be added to this multiplication product to obtain a final result, (ii) performing a multiplication of the first operand 32 and the second operand 34 in a multiplier block to obtain partial product results 74, (iii) inputting the partial product results 120 to a carry-save adder block 100, (iv) performing a partial product reduction of the partial product results 74 to generate a carry-save result 120, comprising a sum term and a carry term, (v) performing a data formatting step of the carry-save result 120 and generating a carry-out bit from the carry-save result 120, (vi) generating the final result by adding the carry-save 120 result to the third operand 90, is demonstrated.

The set of operands 32, 34, 90 also could comprise a hexadecimal and/or a floating-point number and also one of a single, a double, or an extended precision format.

Figure 6:
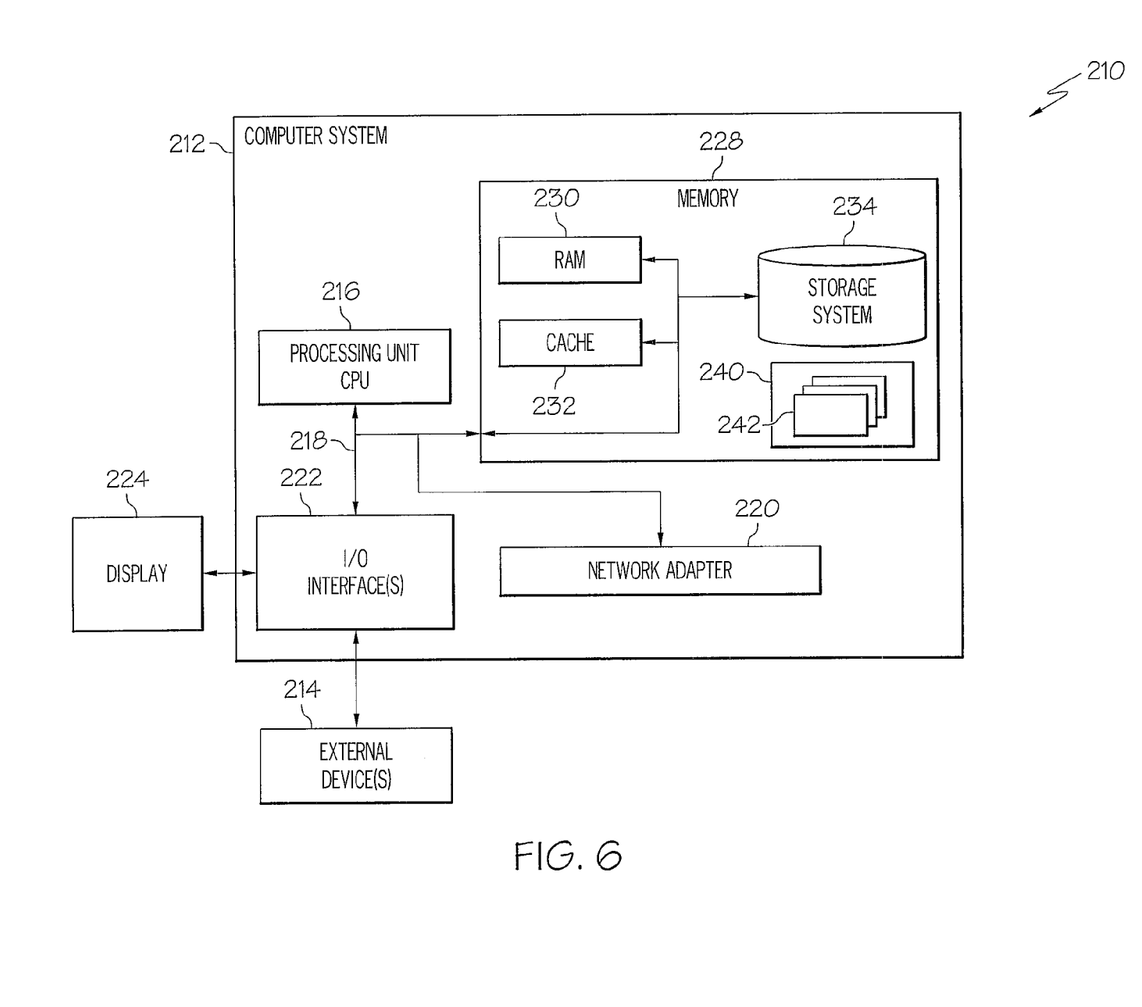
FIG. 6 is a block diagram of a data processing system, in which a preferred embodiment of the present invention is incorporated.

With reference now to FIG. 6, there is illustrated a schematic of an example of a data processing system 210. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210, there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As has been described, the present invention provides a method for operating a fast fused-multiply-add pipeline.

While the invention has been particularly shown and described with reference to a preferred embodiment, it will be understood by those skilled in the art that various changes in form and detail may be made therein without departing from the spirit and scope of the invention.

What is claimed is:

1. A method for operating a fused-multiply-add pipeline in a floating-point unit of a processor, said method comprising:
    performing a multiplication between a first operand and a second operand in a multiplier block to obtain a set of partial product results;
    inputting said partial product results to a carry-save adder block;
    performing a partial product reduction of said partial product results to generate a carry-save result having a sum term and a carry term;
    performing an XNOR operation on the sixth most significant bit of said sum term and the six most significant bit of said carry term of said carry-save result to generate a carry-out bit;
    adding said carry-save result to a third operand to generate a sum; and
    generating a final result by combining said carry-out bit to said sum.

2. The method of claim 1, wherein said multiplication of said first and second operands is performed by a Booth encoding algorithm.

3. The method of claim 1, wherein said plurality of operands has any number of leading zero bits less than the number of bits per operand.

4. The method of claim 1, wherein said method further includes left aligning said carry-save result by shifting out six leading zero bits of said sum and carry terms.

5. The method of claim 1, wherein said adding further includes suppressing a carry-out bit generated from adding said carry-save result to said third operand.

6. The method of claim 1, wherein said adding further includes suppressing a carry-out bit generated from adding said third operand to said carry-save result.

7. The method of claim 1, wherein said carry-save adder block includes a 4-to-2 carry save adder block.

8. A computer-readable device having a computer program product for operating a fused-multiply-add pipeline in a floating-point unit of a processor, said computer-readable device comprising:
    program code for performing a multiplication between a first operand and a second operand in a multiplier block to obtain a set of partial product results;
    program code for inputting said partial product results to a carry-save adder block;
    program code for performing a partial product reduction of said partial product results to generate a carry-save result having a sum term and a carry term;
    program code for performing an XNOR operation on the sixth most significant bit of said sum term and the six most significant bit of said carry term of said carry-save result to generate a carry-out bit;
    program code for adding said carry-save result to a third operand to generate a sum; and
    program code r generating a final result by combining said carry-out bit to said sum.

9. The computer-readable device of claim 8, wherein said multiplication of said first and second operands is performed by a Booth encoding algorithm.

10. The computer-readable device of claim 8, wherein said plurality of operands has any number of leading zero bits less than the number of bits per operand.

11. The computer-readable device of claim 8, wherein said computer-readable device further includes program code for left aligning said carry-save result by shifting out six leading zero bits of said sum and carry terms.

12. The computer-readable device of claim 8, wherein said program code for adding further includes program code for suppressing a carry-out bit generated from adding said carry-save result to said third operand.

13. The computer-readable device of claim 8, wherein said program code for adding further includes program code for suppressing a carry-out bit generated from adding said third operand to said carry-save result.

14. The computer-readable device of claim 8, wherein said carry-save adder block includes a 4-to-2 carry save adder block.

15. A processor having a fused-multiply-add pipeline within a floating-point unit, said processor comprising:
    a multiplier for multiplying a first operand and a second operand to obtain a set of partial product results;

a carry-save adder for performing a partial product reduction on said partial product results to generate a carry-save result having a sum term and a carry term;

an aligner for performing an XNOR operation on the sixth most significant bit of said sum term and the six most significant bit of said carry term of said carry-save result to generate a carry-out bit;

an adder for adding said carry-save result to a third operand to generate a sum, and for generating a final result by combining said carry-out bit to said sum.

16. The processor of claim 15, wherein said multiplication of said first and second operands is performed by a Booth encoding algorithm.

17. The processor of claim 15, wherein said plurality of operands has any number of leading zero bits less than the number of bits per operand.

18. The processor of claim 15, wherein said aligner performs said left aligning said carry-save result by shifting out six leading zero bits of said sum and carry terms.

19. The processor of claim 15, wherein said carry-out bit generated from adding said carry-save result to said third operand is suppressed.

20. The processor of claim 15, wherein said 4-to-2 adder further suppresses a carry-out bit generated from adding said third operand to said carry-save result.

* * * * *